United States Patent [19]

Maytham

[11] 3,978,582
[45] Sept. 7, 1976

[54] CABLE INSULATION STRIPPING TOOL
[75] Inventor: Walter J. Maytham, Los Altos, Calif.
[73] Assignee: Speed Systems, Inc., Los Altos, Calif.
[22] Filed: Feb. 18, 1975
[21] Appl. No.: 550,414

[52] U.S. Cl. .............................. 30/90.1; 81/9.5 C
[51] Int. Cl.² ........................................ H02G 1/12
[58] Field of Search ............... 30/90.1, 91.2, 90.2, 30/90.9, 162, 320, 335; 81/9.5 R, 9.5 C

[56] References Cited
UNITED STATES PATENTS

| | | | |
|---|---|---|---|
| 2,346,227 | 4/1944 | Martin et al. | 30/90.9 |
| 2,385,368 | 9/1945 | Montgomery | 30/90.9 |
| 2,456,882 | 12/1948 | Mackey | 30/92 X |
| 2,548,977 | 4/1951 | Jaeger | 30/90.9 |
| 2,647,309 | 8/1953 | Chisena | 30/90.9 |
| 2,649,838 | 8/1953 | Krause et al. | 30/162 UX |
| 2,662,445 | 12/1953 | Jacoby | 30/335 X |
| 3,089,237 | 5/1963 | Norton | 30/90.9 |
| 3,218,709 | 11/1965 | Norton | 30/90.9 |
| 3,377,891 | 4/1968 | Horrocks | 81/9.5 C |
| 3,398,610 | 8/1968 | Matthews | 81/9.5 C |
| 3,620,104 | 11/1971 | Horrocks | 30/90.1 X |

Primary Examiner—Al Lawrence Smith
Assistant Examiner—J. T. Zatarga
Attorney, Agent, or Firm—Phillips, Moore, Weissenberger, Lempio & Strabala

[57] ABSTRACT

A tool for removing insulation from a cable includes roller means for supporting cables of different diameters while permitting rotation of the tool relative to the cable. The tool includes a blade which is positioned to urge and move the tool and cable relatively axially for each turn of the tool and cable relatively. A bar member is included for limiting relative axial movement of the cable and tool for each turn of the tool and cable relatively, to a certain distance less than such axial distance movement determined by the positioning of the blade, at each turn of the tool and cable relatively.

5 Claims, 6 Drawing Figures

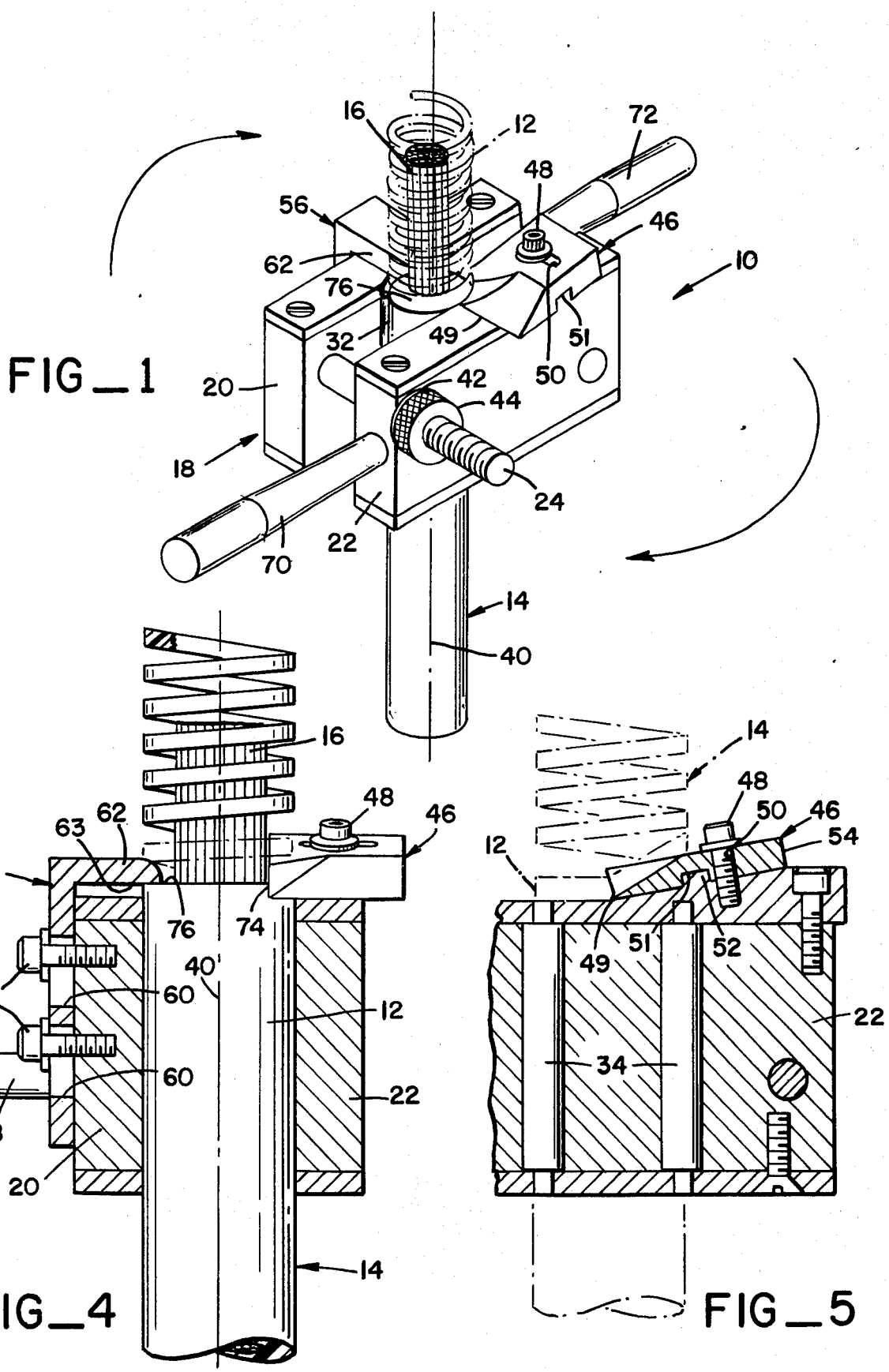

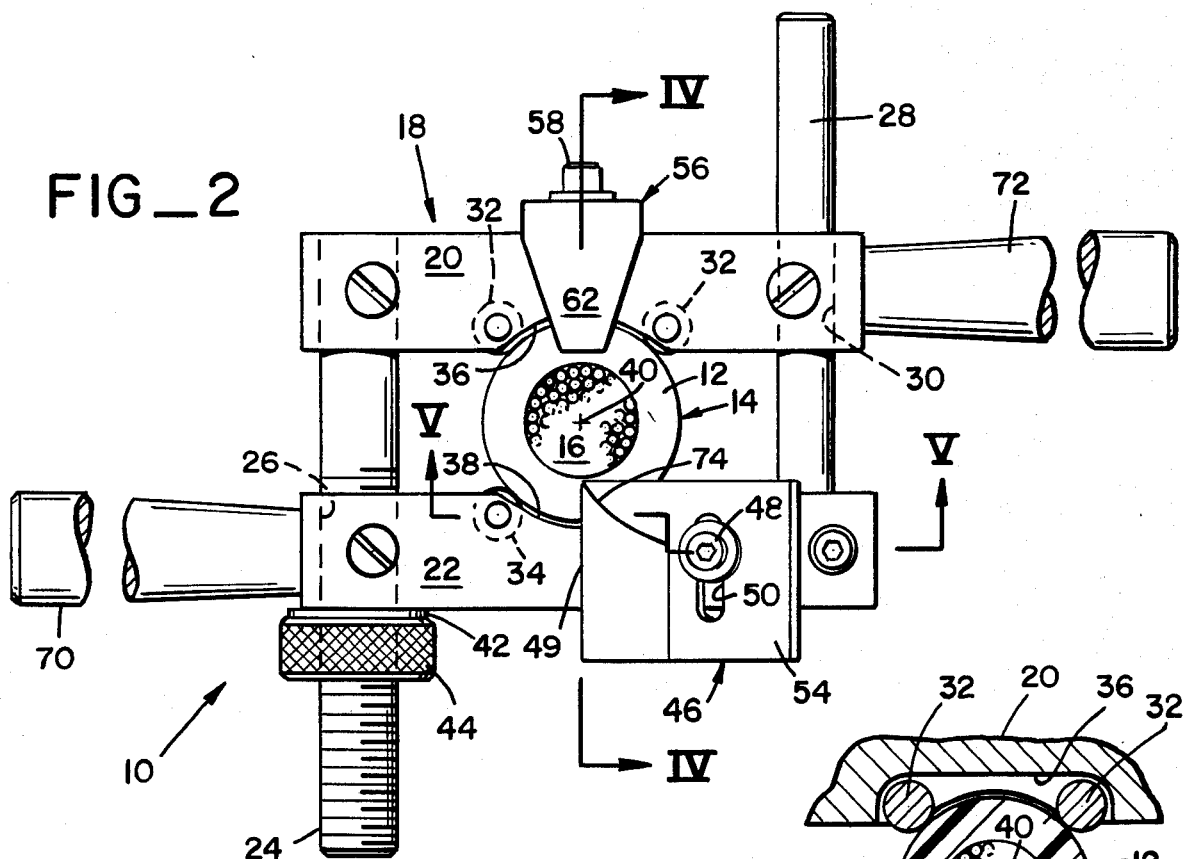
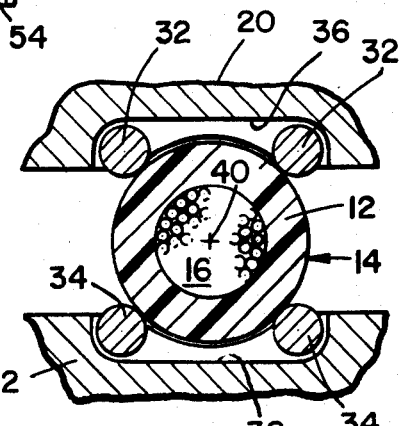
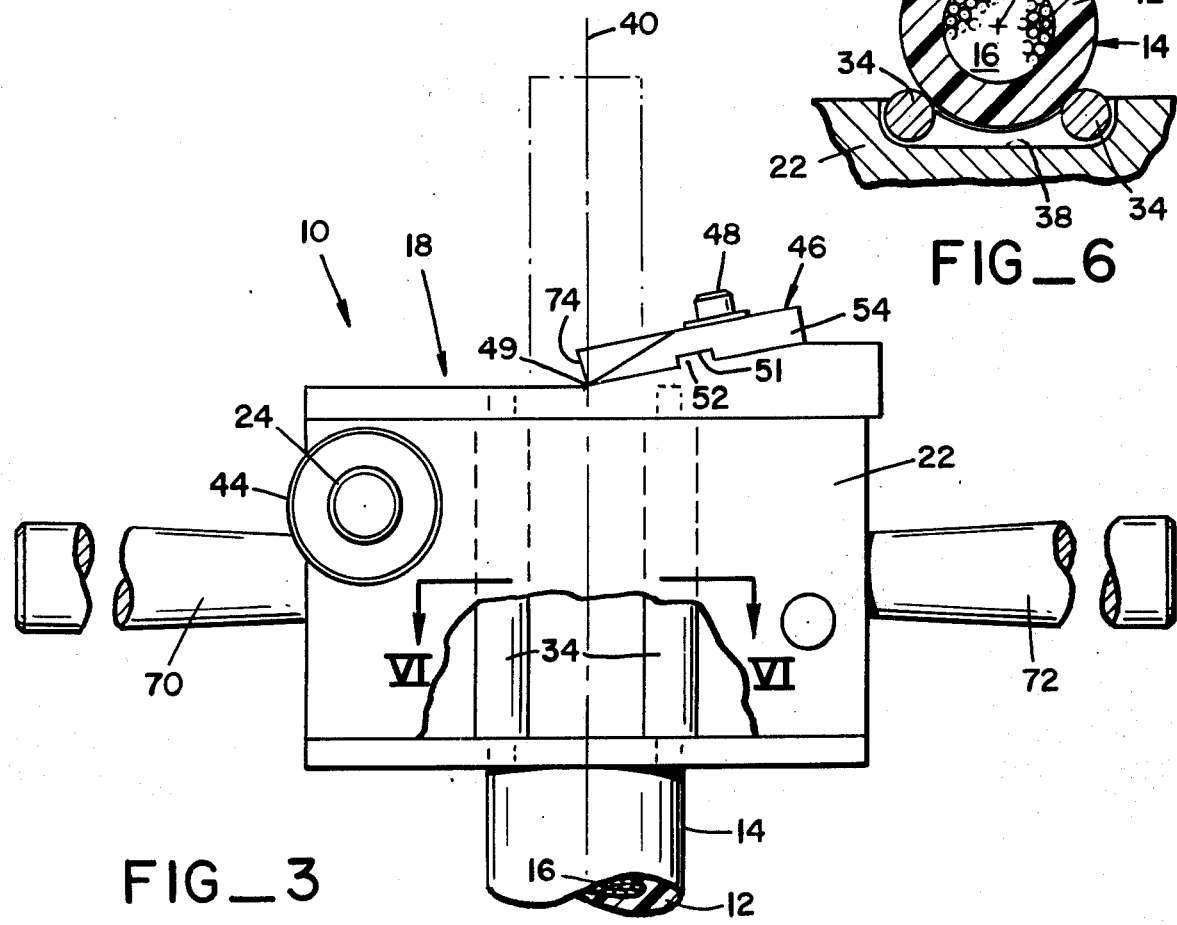

CABLE INSULATION STRIPPING TOOL

BACKGROUND OF THE INVENTION

This invention relates to cable stripping tools, and more particularly, to tools for stripping insulation from electrical conductors.

In the prior art, various devices for stripping insulation from electrical cable have been proposed (see, for example, U.S. Pat. No. 3,826,001 to Bilbrey et al, assigned to the assignee of this invention, and U.S. Pat. No. 3,377,891 to Horrocks). In the case of U.S. Pat. No. 3,826,001, the angular disposition of the blade of the tool relative to the cable may be selectively varied so that such blade will cut a track through the insulation without the application of any axial pressure on either the tool or the cable. Through the choosing of such angular disposition of the blade, the axial thickness of insulation which is cut from a cable at each turn of the tool is determined. While such a system has proved effective in operation, it is to be understood that the angular adjustment of such a blade requires a somewhat complex means for supporting the blade, meanwhile allowing adjustments thereof relative to the body of the tool. Additionally, it should be understood that it would be desirable to provide some additional positive means for determining the axial thickness of insulation to be cut for each turn of the tool and cable relatively.

U.S. Pat. No. 3,377,891 discloses a tool having in combination a bar member which contacts the end of the to-be-cut insulation on the cable, and a blade adjacent such bar which cuts the cable upon relative rotation of the tool and cable. In such apparatus, however, it appears that axial force must be applied relatively between the tool and cable to properly seat the to-be-cut portion of the insulation against the bar. That is, there is no disclosure in such U.S. Pat. No. 3,377,891 of a particular relationship of blade position and bar which determines that the blade is positioned to tend to move the tool and cable relatively axially a greater distance for a turn of the tool and cable relatively than is allowed by the bar. Such structure would have the advantage that the tool need only to be rotated about the cable, and the blade and bar would be positioned so that no axial force is required to move the tool along the cable, with the axial thickness of insulation being cut determined by the relative positioning of the blade and bar.

SUMMARY OF THE INVENTION

It is accordingly an object of this invention to provide a cable stripping tool including in combination a blade and a bar positioned to provide that movement of the tool along the cable upon rotation of the tool about the cable is provided by particular placement of the blade, but with the extent of such movement for a turn of the tool and cable relatively limited by the placement of the bar.

It is a further object of this invention to provide a cable stripping tool which, while fulfilling the above object, provides for smooth and efficient rotation of the tool and cable relatively.

It is a still further object of this invention to provide a cable stripping tool which, while fulfilling the above objects, is capable of properly stripping cables of a variety of diameters.

It is a still further object of this invention to provide a cable stripping tool which, while fulfilling the above objects, is extremely simple in design and effective in use.

Broadly stated, the invention comprises a tool for stripping insulation from an insulated conductor cable, comprising body means, and support means mounted to the body means to support a cable seated thereon. Blade means are mounted to the body means and have a cutting edge, the blade means being positioned so that upon relative turning of the body means and the cable supported by the support means about the longitudinal axis of the supported cable, (i) the cutting edge cuts the insulation thereof and (ii) the supported cable and body means are urged by the blade means to relatively move a distance generally along the longitudinal axis of the supported cable for each turn of the body means and cable relatively. Further included are movement control means for limiting relative movement of the supported cable and body means generally along the longitudinal axis of the supported cable for each turn of the body means and cable relatively, to a certain distance less than the distance the supported cable and body means would relatively be moved generally along the longitudinal axis of the cable so supported under the urging of the blade means, whereby the movement control means determined the axial thickness of insulation removed from the supported cable at each turn of the body means and cable relatively.

BRIEF DESCRIPTION OF THE DRAWINGS

These and other objects of the invention will become apparent from a study of the following specification and drawings, in which:

FIG. 1 is a perspective view of the tool incorporating the invention, and in combination with a cable;

FIG. 2 is an end elevation of the tool, in combination with a cable;

FIG. 3 is a plan view of the tool of FIGS. 1 and 2, in combination with a cable;

FIG. 4 is a sectional view taken along the line IV—IV of FIG. 2;

FIG. 5 is a sectional view taken along the lines V—V of FIG. 2; and

FIG. 6 is a sectional view taken along the lines VI—VI of FIG. 3.

DESCRIPTION OF THE PREFERRED EMBODIMENT

Shown in FIGS. 1–3 is a tool 10 for use in removing or stripping insulation 12 from a cable 14, such insulation covering the core or conductor 16 of the cable 14. The cable 14 in this case may have a diameter of from 1-¾ inch to 3-¼ inches, and the insulation 12 provided on such cable 14 may include a number of concentric layers of insulating and protective materials, frequently of substantially greater cross-sectional extent than that of the conductor itself. These materials may include rubber, light metal shieldings, polyvinyl chloride, synthetic elastomers and semi-conductors possessing different degrees of thickness and cutting resistance. Thus, the reference to insulation used herein may refer to any of these layers overlying the core or conductor.

The tool 10 includes body means 18 made up of body portion 20 and body portion 22. The body portion 20 has fixed thereto and extending generally perpendicularly therefrom a threaded shaft 24, which extends through an aperture 26 defined by the body portion 22.

The body portion 22 has fixed thereto a shaft 28 disposed generally perpendicular thereto, and extending through an aperture 30 in the body portion 20. The shafts 24,28 allow movement of the body portions 20,22 relatively toward and away from each other, through sliding of the shafts 24,28 in the respective apertures 26,30, and the cable 14 is positionable as shown particularly in FIGS. 2 and 6 between the body portions 20,22, and is solely supported on and seated on rollers 32 rotatably mounted to the body portion 20, and rollers 34 rotatably mounted to the body portion 22. The body portions 20,22 define respective indented portions 36,38 to insure that the cable 14 is so solely supported by the rollers 32,34. The rollers 32,34 are positioned generally about the supported cable 14, with the axis of rotation of each roller 32,34 being substantially parallel to the longitudinal axis 40 of the supported cable 14. A washer 42 is disposed on the threaded shaft 24, and a nut 44 is threadably engaged with the threaded shaft 24, so that the body portions 20,22 may be forced together with the cable 14 therebetween upon hand turning of the nut 44, to seat the cable 14 on the rollers 32,34.

It will be understood that shaft 28 may also be threaded, and may have fitted thereto a washer and nut, similar to washer 42 and nut 44, to aid in the forcing of the body portions 20,22 together.

A blade 46 is mounted to the body portion 22 by means of a bolt 48 disposed through a slot 50 defined by the blade 46 and in threaded engagement with the body portion 22. The blade 46 is positioned so that the cutting edge 49 thereof lies substantially along a line intersecting and substantially perpendicular to the longitudinal axis 40 of the cable 14 seated on the rollers 32,34. The blade 46 is mounted to the body portion 22 in such a way that such blade 46 may be adjusted position-wise relative to the body portion 22 to move the cutting edge 46 toward and away from the longitudinal axis 40 of the seated cable 14, the cutting edge 49 moving substantially along the line mentioned above intersecting the longitudinal axis 40 of such cable 14 seated on the rollers 32,34. For providing the guiding of such adjustment motion, the blade 46 defines an elongated recess 51, and the body portion 22 defines an elongated rib 52 positioned and seated in the recess 51, the elongated recess 51 and the rib 52 being disposed substantially parallel to the cutting edge 49 of the blade 46. The elongated slot 50 is disposed substantially parallel to the cutting edge 49 also, and it will be seen that the recess 51 and rib 52 act as guide means for guiding the movement of the blade 46 upon adjustment of the position thereof relative to the body portion 22.

The guide means for guiding the movement of the blade 46 may also take the form of a key disposed in a channel defined by the body portion, the key being positioned substantially as the rib 52 is positioned, and fitted on the recess 51. As yet another alternative, the body portion 22 may define a step which is positioned to contact the end of the blade away from the cutting edge, to guide the blade movement in a manner similar to the recess 51 and rib 52.

It will also be understood that as yet another alternative a spacer may be disposed between the blade 46 and body portion 22, seated in channels in the blade and body portion, to act as a key, similar to that previously described. Or, as yet another alternative, the body portion 22 could define elongated serrations which engage corresponding elongated serrations defined by the blade 46, such serrations being positioned to guide the blade movement in a manner similar to the recess 51 and rib 52. In any case, it will be seen that the guiding movement described above is achieved.

The body 54 of the blade 46 is angled and positioned relative to the body means 18 (see FIG. 3) so that upon relative turning of the tool 10 and cable 14 about the longitudinal axis 40 of the cable 14, the cutting edge 49 cuts the insulation 12 of the cable 14, and the supported cable 14 and tool 10 are urged by the blade 46 to relatively move a distance generally along the longitudinal axis 40 of the cable 14 for each turn of the tool 10 and cable 14 relatively. A feed control bar member 56 is mounted to the body portion 20 by means of bolts 58 disposed through slots 60 defined by the bar member 56 and in threaded engagement with the body portion 20. The bar member 56 has a control bar member portion 62 which is positioned as best shown in FIGS. 2 and 4, the cutting edge 49 and the bar member portion 62 being positioned on substantially opposite sides of a cable 14 seated on the rollers 32,34. The elongated slots 60 are disposed substantially parallel to the longitudinal axis 40 of the seated cable 14, and allow for adjustment of the position of the bar member portion 62 relative to the body portion 20 along the longitudinal axis 40 of the seated cable 14.

In the use of the device, nut 44 is backed off shaft 24, to allow the placement of a cable 14 between the body portions 20,22, and such portions 20,22 are forced together by the turning of the nut 44 to seat the cable 14 on the rollers 32,34. The cable 14 is initially seated to bring the insulation 12 into contact with the cutting edge 49 of the blade 46, the blade 46 being appropriately adjusted through the means described above to position the inner end of the blade 46 appropriately adjusted through the means described above to position the inner end of the blade 46 appropriately relative to the depth of insulation 12 to be cut. The cutting edge 49 is positioned inwardly of the tool 10 relative to the inner surface 63 (FIG. 4) of the bar member portion 62, and the tool 10 is rotated about the longitudinal axis 40 of the cable 14 by means of handles 70,72 respectively fixed to and extending from the body portions 22,20. As described above, the positioning of the blade 46 is chosen so that, while the cutting edge 49 thereof is cutting into the insulation 12 due to such relative rotation of the tool 10 and cable 14, the positioning of such blade 46 urges the tool 10 generally along the longitudinal axis 40 of the cable 14 for each turn of the tool 10 and cable 14 respectively. The blade 46 as shown also includes a lifting edge 74 for lifting the insulation 12 away from the core 16 as such insulation is cut by the cutting edge 49.

Upon an appropriate degree of turning of the tool 10 about the cable 14, the end surface 76 (FIG. 4) of the portion of insulation 12 remaining to be cut is brought into contact with the inner surface 63 of the feed control bar member portion 62. The bar member portion 62 and blade 46 are appropriately positioned so that, upon continued turning of the tool 10 about the cable 14, the bar member portion 62 limits relative movement of the cable 14 and tool 10 generally along the longitudinal axis 40 of the supported cable 14 and tool 10 would relatively be moved along such longitudinal axis 40 under the above-described urging of the blade 46. It will thus be seen that the axial thickness of insulation 12 removed from the supported cable 14 at each turn of the tool 10 and cable 14 relatively is determined by the positioning of the feed control bar member 56 relative to the cutting edge 49, as measured along the longitudinal axis 40 of the seated cable 14, such dimension being adjustable through appropriate use of the slots 60 defined by the bar member 56.

To end the cutting of the insulation 12, the tool 10 is rotated on a reverse direction about the cable 14, and the feed control bar member 56 is moved, after loosening of the bolts 58, to bring the surface 63 into line with the cutting edge 49, whereupon the bolts 58 are tightened. The tool 10 is then rotated back in the other direction, and because of such positioning of the surface 63 relative to the edge 49, a square-cut face on the insulation end is achieved.

It will be seen that simple and effective means are provided for determining the axial thickness of insulation 12 to be cut and removed from the cable 14 at each turn of the tool 10 about the cable 14. Such effective means do not require the variation of the angling or positioning of the body of a blade to achieve such variation of thickness of axial cut. Additionally, the fact that the cable 14 is seated only on roller means as described above results in the fact that the tool 10 may be relatively easily and conveniently rotated about the cable 14, and insulation 12 may be effectively cut and removed therefrom, with minimal effort on the part of the user of the tool 10.

What is claimed is:

1. A tool for stripping insulation from an insulated conductor cable comprising:
   body means;
   support means mounted to said body means to support a cable seated thereon;
   blade means mounted to said body means and having a cutting edge, the blade means being positioned so that upon relative turning of the body means and cable supported by the support means, about the longitudinal axis of the supported cable, (i) the cutting edge cuts the insulation thereof and (ii) the supported cable and body means are urged by the blade means to relatively move a distance generally along the longitudinal axis of the supported cable for each turn of the body means and cable relatively; and
   movement control means for limiting relative movement of the supported cable and body means generally along the longitudinal axis of the supported cable for each turn of the body means and cable relatively, to a certain distance less than the distance the supported cable and body means would relatively be moved generally along the longitudinal axis of the cable so supported under urging of the blade means, whereby the movement control means determine the axial thickness of insulation removed from the supported cable at each turn of the body means and cable relatively;
   wherein the support means comprise support roller means comprising a plurality of rollers rotatably mounted to the body means, the axis of rotation of each roller being substantially parallel to one another and to the longitudinal axis of a cable to be supported thereby such that said rollers are positioned generally about a cable seated on the roller means, so that a cable seated on the plurality of rollers is generally surrounded by the rollers and supported thereby, the rollers rolling upon relative turning of the body means and cable.

2. The tool of claim 1 wherein the body means comprise a first body portion and a second body portion, between which a cable is positionable, and wherein the first and second body portions are movable relatively toward and away from each other, the support roller means moving therewith, to allow cables of varying sizes to be fitted between the first and second body portions, and means for forcing the first and second body portions relatively together to seat a cable disposed therebetween on said support roller means.

3. A tool for stripping isulation from an insulated conductor cable comprising:
   body means;
   support means mounted to said body means to support a cable seated thereon;
   blade means mounted to said body means and having a cutting edge, the blade means positioned so that upon relative turning of the body means and cable supported by the support means, about the longitudinal axis of the supported cable, (i) the cutting edge cuts the insulation thereof and (ii) the supported cable and body means are urged by the blade means to relatively move a distance generally along the longitudinal axis of the supported cable for each turn of the body means and cable relatively; and
   movement control means for limiting relative movement of the supported cable and body means generally along the longitudinal axis of the supported cable for each turn of the body means and cable relatively, to a certain distance less than the distance the supported cable and body means would relatively be moved generally along the longitudinal axis of the cable so supported under urging of the blade means, whereby the movement control means determines the axial thickness of insulation removed from the supported cable at each turn of the body means and cable relatively;
   wherein the movement control means comprise a bar member mounted to the body means and having a bar member portion positioned to contact the end surface of the remaining to-be-cut portion of insulation of a cable seated on the support means;
   wherein the support means comprises support roller means comprising a plurality of rollers rotatably mounted to the body means, the axis of rotation of each roller being substantially parallel to one another and to the longitudinal axis of a cable to be supported thereby such that said rollers are positioned generally about a cable seated on the roller means, so that a cable seated on the plurality of rollers is generally surrounded by the rollers and supported thereby, the rollers rolling upon relative turning of the body means and cable.

4. The tool of claim 3 wherein the body means comprise a first body portion and a second body portion, between which a cable is positionable, and wherein the first and second body portions are movable relatively toward and away from each other, the support roller means moving therewith, to allow cables of varying sizes to be fitted between the first and second body portions, and means for forcing the first and second body portions relatively together to seat a cable disposed therebetween on said support roller means.

5. A tool for stripping insulation from an insulated conductor cable comprising:
   body means;

support means mounted to said body means to support a cable seated thereon;

blade means mounted to said body means and having a cutting edge, the blade means being positioned so that upon relative turning of the body means and cable supported by the support means, about the longitudinal axis of the supported cable, (i) the cutting edge cuts the insulation thereof and (ii) the supported cable and body means are urged by the blade means to relatively move a distance generally along the longitudinal axis of the supported cable for each turn of the body means and cable relatively; and movement control means for limiting relative movement of the supported cable and body means generally along the longitudinal axis of the supported cable for each turn of the body means and cable relatively, to a certain distance less than the distance the supported cable and body means would relatively be moved generally along the longitudinal axis of the cable so supported under urging of the blade means, whereby the movement control means determines the axial thickness of insulation removed from the supported cable at each turn of the body means and cable relatively;

wherein the movement control means comprise a bar member mounted to the body means and having a bar member portion positioned to contact the end surface of the remaining-to-be-cut portion of insulation of a cable seated on the support means;

further comprising means for providing the adjustment of the position of the bar member portion relative to the body means along the longitudinal axis of a cable seated on the support means;

wherein the cutting edge of the blade means and the bar member portion are positioned on substantially opposite sides of a cable seated on the support means;

wherein the cutting edge of the blade means is positioned substantially along a line intersecting the longitudinal axis of a cable seated on the support means, said line being substantially perpendicular to the longitudinal axis of the cable seated on the support means;

further comprising means for providing adjustment of the position of the blade relative to the body means to move the cutting edge substantially along the line intersecting the longitudinal axis of a cable seated on the support means;

further comprising guide means for guiding movement of the blade upon said adjustment of the position thereof relative to the body means, wherein the guide means comprise an elongated recess defined by the blade, and an elongated rib defined by the body means and positioned in said recess, said elongated recess and rib being disposed substantially parallel to the cutting edge, wherein the support means comprise support roller means comprising a plurality of rollers rotatably mounted to the body means, the axis of rotation of each roller being substantially parallel to one another and to the longitudinal axis of a cable to be supported thereby such that said rollers are positioned generally about a cable seated on the roller means, and wherein the body means comprise a first body portion and a second body portion, between which a cable is positionable, and wherein the first and second body portions are movable relatively toward and away from each other, the support roller means moving therewith, to allow cables of varying sizes to be fitted between the first and second body portions, and means for forcing the first and second body portions relatively together to seat a cable disposed therebetween on said support roller means.

* * * * *